United States Patent [19]
Takahashi et al.

[11] Patent Number: 5,617,248
[45] Date of Patent: Apr. 1, 1997

[54] DIFFRACTION GRATING ARRAY AND DISPLAY HAVING A DIFFRACTION GRATING

[75] Inventors: Susumu Takahashi, Matsudo; Toshiki Toda, Satte, both of Japan

[73] Assignee: Toppan Printing Co., Ltd., Tokyo, Japan

[21] Appl. No.: 406,521

[22] Filed: Mar. 20, 1995

[30] Foreign Application Priority Data

Apr. 18, 1994 [JP] Japan ................................. 6-078870

[51] Int. Cl.⁶ ............................................. G02B 5/18
[52] U.S. Cl. ......................... 359/567; 359/569; 359/574
[58] Field of Search ............................ 359/567, 569, 359/566, 23, 24, 477, 462–464, 574

[56] References Cited

U.S. PATENT DOCUMENTS

| | | | |
|---|---|---|---|
| 4,118,104 | 10/1978 | Yamada et al. | |
| 5,032,003 | 7/1991 | Antes | 359/23 |
| 5,058,992 | 10/1991 | Takahashi | 359/567 |
| 5,301,062 | 4/1994 | Takahashi et al. | 359/567 |

FOREIGN PATENT DOCUMENTS 0497292 8/1992 European Pat. Off. .
WO94/28444 12/1994 WIPO .

*Primary Examiner*—Jon W. Henry
*Attorney, Agent, or Firm*—Armstrong, Westerman, Hattori, McLeland & Naughton

[57] ABSTRACT

A display having a diffraction grating comprises a substrate, a plurality of diffraction grating cells formed over a surface of the substrate and comprising a diffraction grating having curve portions arranged in a parallel shift relation, and a light-shutting unit including light-shutting elements having an opening, wherein a length of the diffraction grating in a direction perpendicular to that shift direction of the curve portions is made substantially equal to a length of the opening of the light-shutting element in the light-shutting unit, a diffraction grating element in the diffraction grating is repeated at least once in a direction perpendicular to the shift direction of the curve portions to provide the above cell, a length of the cell in the direction perpendicular to the shift direction of the curve portions is made substantially equal to a pitch length of the light-shutting element in the light-shutting unit, and the light-shutting unit is arranged on an illumination light entry side of the diffraction grating or on an diffraction light exit side of the diffraction grating and has an opening of a given configuration.

9 Claims, 4 Drawing Sheets

DIFFRACTION GRATING ARRAY AND DISPLAY HAVING A DIFFRACTION GRATING

BACKGROUND OF THE INVENTION

1. Field of the Invention

The present invention relates to a diffraction grating array having minute diffraction gratings each arranged over a surface of a substrate for each cell and a display having a diffraction grating pattern and, in particular, to a diffraction grating array and a diffraction grating pattern-equipped display which can reproduce a correct image even when there arises any positional displacement between a light-shutting means and a diffraction grating pattern.

2. Description of the Related Art

A conventional display has often been used in which a plurality of minute cells, each comprised of a diffraction grating, are arranged over a surface of a substrate to provide a diffraction grating pattern. The method for manufacturing a display having this type of diffraction grating pattern is disclosed, for example, in JPN PAT APPLN KOKAI PUBLICATION 60-156004. This method comprises varying a minute interference fringe by a two-light interference with respect to its pitch, direction and light intensity and subjecting photo-sensitive films to a light one after another.

In recent years, another method has been disclosed in U.S. Pat. No. 5,058,992 (1991. 10. 22), according to which a display is manufactured with a given type of diffraction grating pattern formed by a plurality of minute cells (diffraction gratings) over the surface of a substrate through the movement of a substrate-mount X-Y stage under control of a computer while using, for example, an electron light exposure apparatus.

The display so manufactured uses, as a type of display image pattern having a diffraction grating pattern, an image input by an image scanner, etc., or a two-dimensional image, etc., formed by the computer graphics.

Since, however, the type of image pattern represented by the diffraction grating pattern is formed on a plane at a diffraction grating-applied substrate, only a planar (two-dimensional) type of image pattern can be represented so that a solid (3-D) image pattern cannot be displayed.

The technique of U.S. Pat. No. 5,301,062, for example, has recently been proposed by the applicant which discloses a display having a diffraction grating pattern capable of freely representing a solid (3-D) image.

With the display having this type of diffraction grating pattern, a diffraction grating constituting a cell is comprised of a plurality of groups of identical curve portions which are shifted in a parallel relation and a light-shutting means is arranged on the illumination light entry side or on the illumination light exit side of the diffraction grating and has an opening of a given configuration.

With such a display, any given intensity distribution of the illumination light is created on the diffraction grating array by the light-shutting means to determine a display pattern. Or the intensity of the diffraction light is modulated, by the diffraction grating array, through the light-shutting means to provide the intensity distribution of any diffraction light and, by doing so, to determine a display pattern.

The light-shutting means is intended to means a type which not only can render the light on and off but also can spatially modulate the light intensity at a given level. As an example of such a means, there is a liquid crystal display plate of such a type as used for an LC type television.

Generally, for the case of a cell matrix-like space light modulation element, such as an LC panel, the light modulating opening and size are made smaller than the pitch between the opening's elements and the respective opening-to-opening area is occupied by a non-light-transmissive area. In the case where the above space light modulation element is used as the light-shutting means as set out above, one opening of the space light modulation element is referred as a light-shutting element. In the case where the size of the light-shutting element is made smaller than the light-shutting element's pitch, it follows that, in the diffraction grating pattern of U.S. Pat. No. 5,301,062 above, the sizes of the light-shutting element and the diffraction grating element are made nearly equal and provide a one-to-one correspondence as shown, for example, in FIG. 5.

If any positional displacement occurs between the light-shutting element and the diffraction grating pattern, defects are produced in a diffraction direction of the diffraction light as shown, for example, in FIG. 6, thus failing to reproduce a correct image.

That is, since the identical gratings are arranged in the shift direction (normally, a vertical direction) of those curve portions of which the diffraction grating is composed, even if any positional displacement is produced, a correct image is reproduced so long as the light-shutting element is present in a range of the diffraction grating element.

However, the gratings of different inclinations are present in a parallax-produced direction (normally a horizontal direction) and, if the light-shutting element is made smaller in size than the diffraction grating element, part of the diffraction light is lacking, thus making it difficult to reproduce a correct image.

In order to reproduce such a correct image in the diffraction grating pattern as shown in FIG. 5, a strict positional alignment has to be achieved between the light-shutting means and the diffraction grating. This involves high costs and difficulty is encountered in obtaining a large-size unit.

As already set out above, with the display having a conventional diffraction grating pattern, it has been difficult to reproduce a correct image if any positional displacement occurs between the light-shutting means and the diffraction grating pattern.

SUMMARY OF THE INVENTION

It is accordingly an object of the present invention to provide a diffraction grating array capable of reproducing a correct image even when any positional displacement is produced between a diffraction means and a diffraction grating pattern.

In order to achieve the above-mentioned object of the present invention, there is provided a diffraction grating array comprising:

a substrate; and a plurality of diffraction grating cells formed over a surface of the substrate and comprising a diffraction grating having curve portions arranged in a parallel shift relation such that any given curve portion does not intersect with those adjacent curve portions, wherein a length of the diffraction grating element in a direction perpendicular to that shift direction of the curve portions is made substantially equal to a length of an opening of one light-shutting element of an associated light-shutting means;

the diffraction grating element is repeated at least once in a direction perpendicular to the shift direction of the curve portions to provide the cell; and a length of the cell in the direction perpendicular to the shift direction of the curve portions is made substantially equal to a pitch length of the light-shutting element in the light-shutting means.

In order to achieve a further object of the present invention, there is provided a display having a diffraction grating, comprising:

a substrate;

a plurality of diffraction grating cells formed over a surface of the substrate and comprising a diffraction grating element having curve portions arranged in a parallel shift relation such that any given curve portion does not intersect with those adjacent curve portions; and light-shutting means including light-shutting elements having an opening; wherein a length of the diffraction grating element in a direction perpendicular to that shift direction of the curve portions is made substantially equal to a length of the opening of the light-shutting element in the light-shutting means;

the diffraction grating element is repeated at least once in a direction perpendicular to the shift direction of the curve portions to provide the cell;

a length of the cell in the direction perpendicular to the shift direction of the curve portions is made substantially equal to a pitch length of the light-shutting element in the light-shutting means; and the light-shutting means is arranged on an illumination light entry side of the diffraction grating and has an opening of a given configuration.

In order to achieve still further object of the present invention, there is provided a display having a diffraction grating pattern, comprising:

a substrate;

a plurality of diffraction grating cells formed over a surface of the substrate and comprising a diffraction grating element having curve portions arranged in a parallel shift relation; and light-shutting means including light-shutting elements having an opening, wherein a length of the diffraction grating element in a direction perpendicular to that shift direction of the curve portions is made substantially equal to a length of the opening of the light-shutting element in the light-shutting means;

the diffraction grating element is repeated at least once in a direction perpendicular to the shift direction of the curve portions to provide the cell;

a length of the cell in the direction perpendicular to the shift direction of the curve portions is made substantially equal to a pitch length of the light-shutting element in the light-shutting means; and the light-shutting means is arranged on an diffraction light exit side of the diffraction grating and has an opening of a given configuration.

With the above-mentioned diffraction grating array and the display having such a diffraction grating pattern, even if any positional displacement is produced, in a pitch range of the light-shutting element, between the diffraction grating and the light-shutting element, the curve portion pattern is repeated so that those defects resulting from the positional displacement are complemented by the adjacent curve portion patterns and hence the diffraction light is complemented to obtain a correct reconstruction image.

On the other hand, as a light-shutting means use may be made of a space light modulation element composed of a liquid crystal and it is possible to vary a display pattern on the space light modulation element, for a short time period, by means of the space light modulation element so that an animation can be obtained as a 3-D (solid) image.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

The concept of the present application will be explained below.

A diffraction grating pattern of the present invention is of such a type that a diffraction grating element is made greater in size than, but equal in pitch to a light-shutting element, whereby a correct image can be reconstructed even if their positional alignment is poor.

Figure 3:
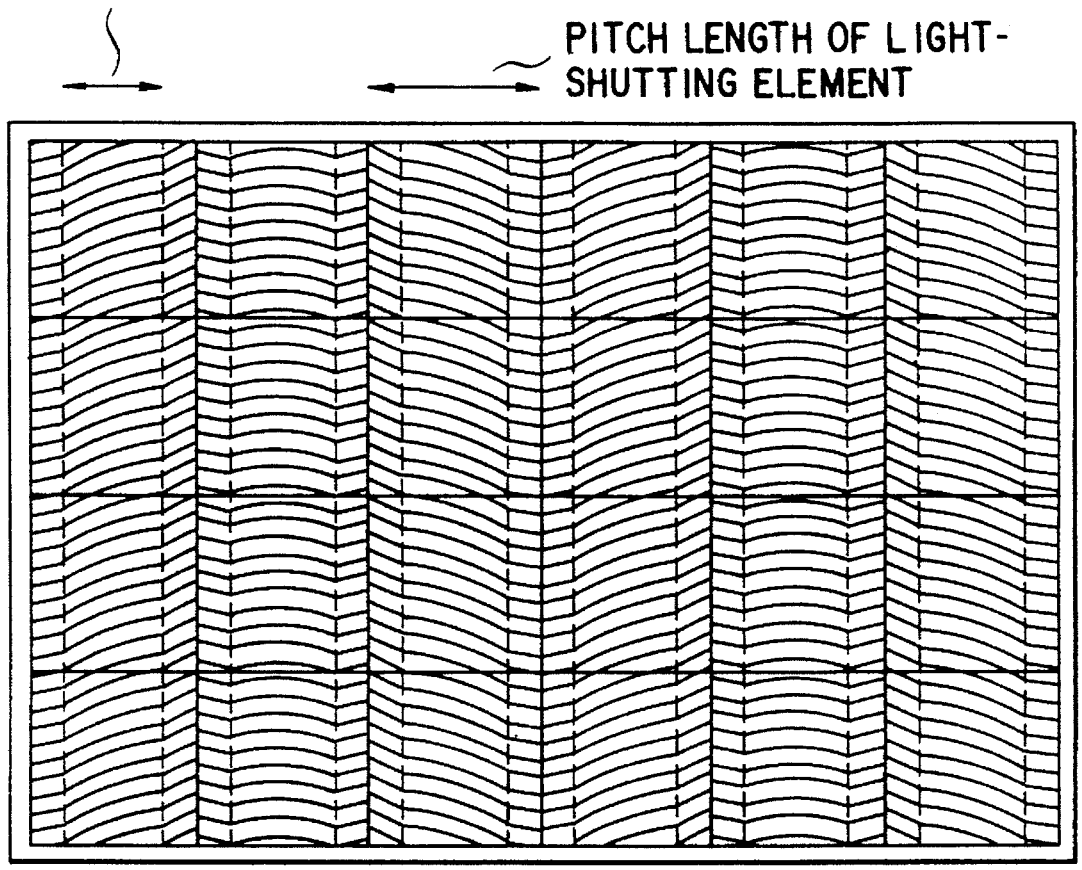
FIG. 3 is a plan view for explaining the diffraction pattern according to the present invention.

According to the present invention, as shown in FIG. 3, use is made of a pattern comprised of a curve pattern repeated, at a light-shutting element's width, up to a pitch length of the light-shutting element in a direction (normally in a horizontal direction) in which parallax occurs.

Even if, in this case, a positional displacement occurs between the diffraction grating and the light-shutting element in a pitch range of the light-shutting elements, those defects resulting from the positional displacement are complemented by adjacent curve portions of the repeated curve pattern, so that a correct reconstruction image can be obtained.

Figure 4:
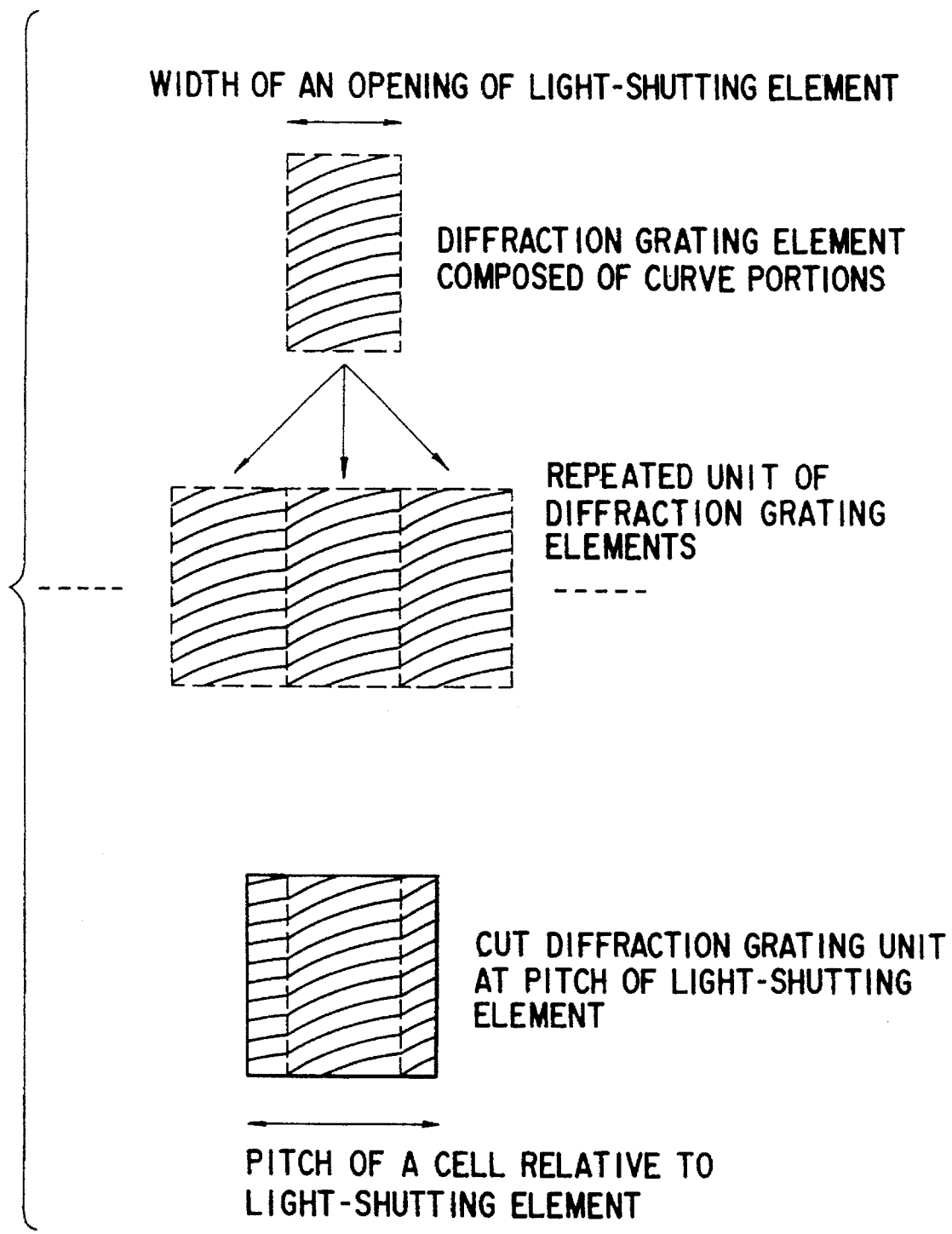
FIG. 4 is a partially expanded view for explaining a method for fabricating a diffraction grating in the diffraction grating pattern.
Figure 5:
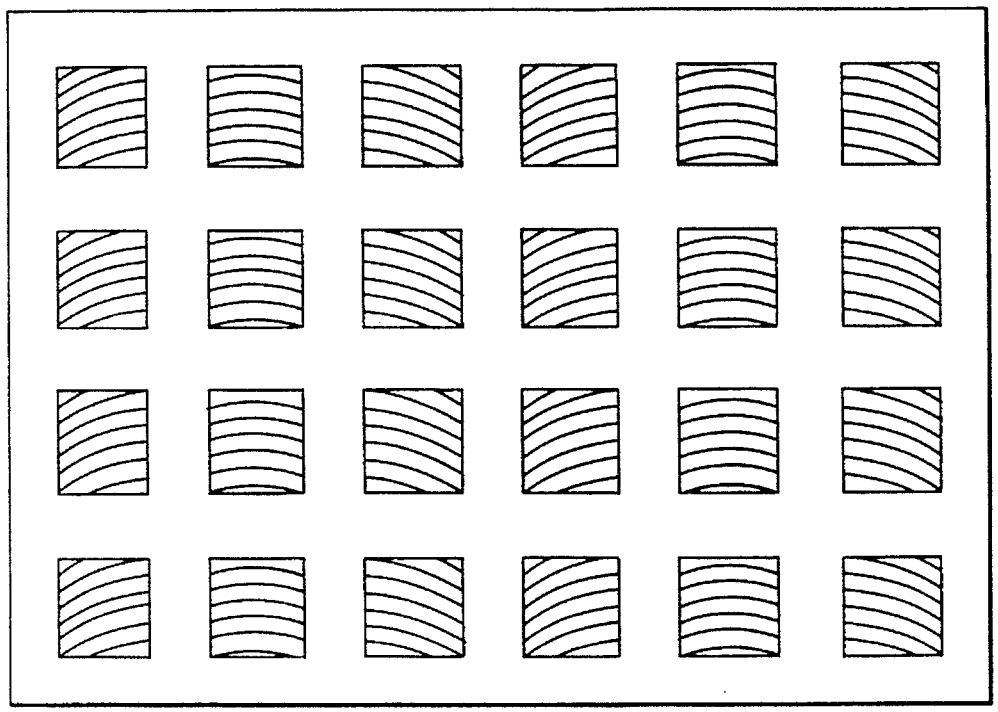
FIG. 5 is a plan view showing one form of a conventional display having a diffraction grating pattern.
Figure 6:
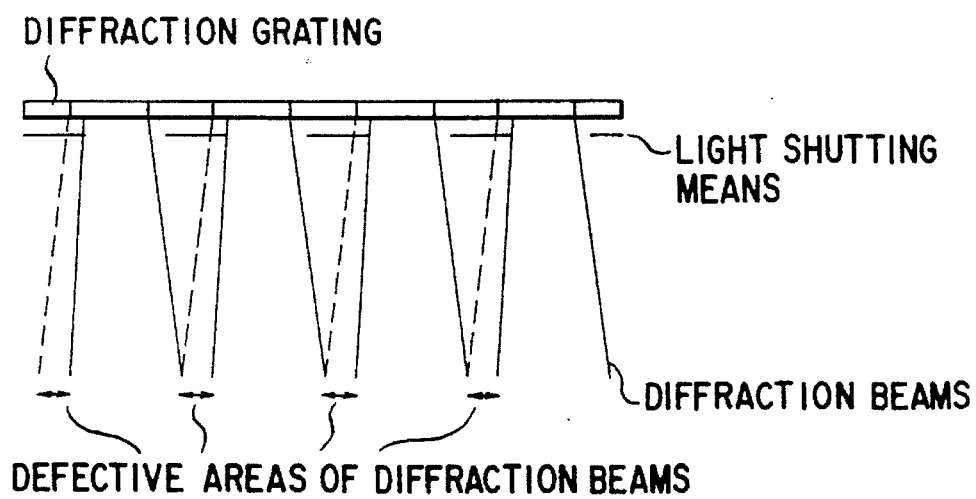
FIG. 6 is a diagrammatic view for explaining a problem as caused on the conventional display having a diffraction grating pattern.

The diffraction grating element is formed as shown, for example, in FIG. 4. A variety of terms are used hereafter to describe the diffraction grating, such as diffraction grating elements, diffraction grating structure, diffraction grating pattern, diffraction grating array, diffraction grating cells, and plurality of diffraction grating cells, and these terms are intended to refer to diffraction grating cells formed by a repeating grating element.

That is, first, the diffraction grating is so formed that its grating elements each correspond to the width of an opening of the light-shutting element. The diffraction grating is comprised of a plurality of curve portions. The curve portions are so formed as to vary from one inclination to another initially calculated. That is, the diffraction grating is comprised of a plurality of curve portions arranged in a parallel shift positional relation.

Then a plurality of diffraction grating elements corresponding to the width of the opening of the light-shutting element are so arranged at the same pitch as the width of the light-shutting element in a direction perpendicular to the parallel shift direction.

The resultant diffraction grating structure is cut at the pitch of the light-shutting element to provide a diffraction grating pattern comprised of diffraction grating cells.

A plurality of such diffraction grating cells each comprised of diffraction grating elements are arranged over a substrate to provide a diffraction grating array.

A light-shutting means having an opening of a predetermined configuration is arranged on one side of the diffraction grating, that is, on an illumination light entry side or on a diffraction light exit side of the diffraction grating, to provide a display having a diffraction grating pattern.

One embodiment of the present invention based on the above-mentioned concept will be explained below with reference to the accompanying drawings.

Regarding a method (a parallax image inputting method) for inputting a plurality of planar images upon the formation of a diffraction grating pattern, a method for determining the direction and pitch of a diffraction grating, a cell configuration, etc., U.S. Pat. No. 5,301,062 as set out above discloses a similar disclosure and any further explanation will be omitted.

Figure 1:
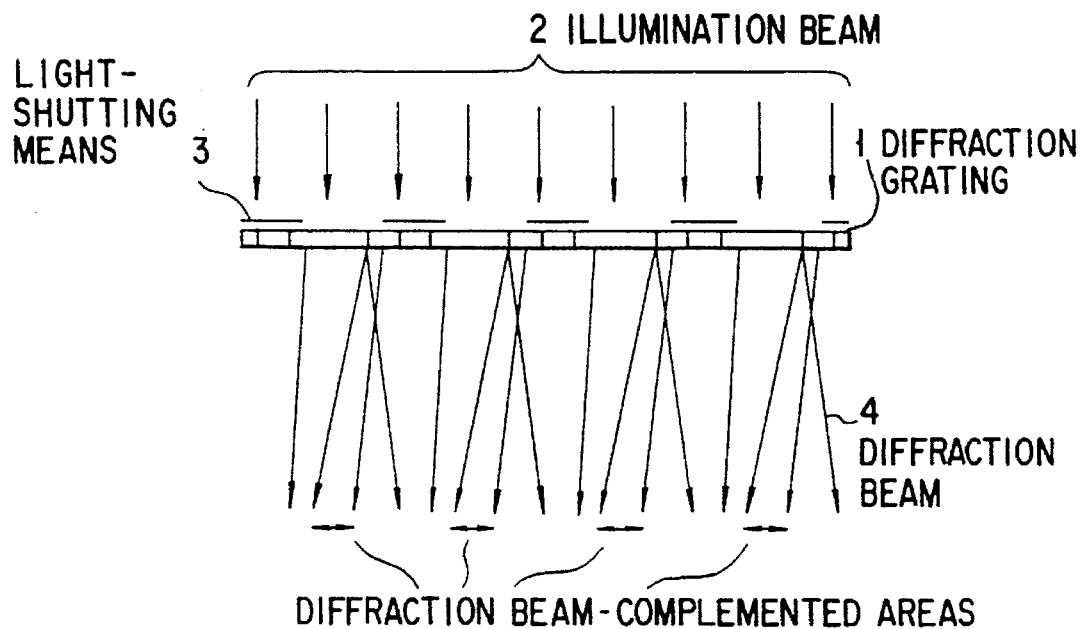
FIG. 1 is a diagrammatic view showing a display having a diffraction grating pattern according to a first embodiment of the present invention.

FIG. 1 is a diagrammatic view showing a practical form of a display having a diffraction grating pattern according to a first embodiment of the present invention.

That is, the display having a diffraction grating pattern of the present embodiment is comprised of a display body having a diffraction pattern with each minute diffraction grating 1 arranged, per cell, over the surface of a substrate as shown in FIG. 1. A light-shutting means 3 is arranged, relative to the display body, on an illumination light 2 entry side of the diffraction grating 1 and has an opening of predetermined configuration (a square configuration in the present invention).

On the other hand, the diffraction grating 1 comprises a plurality of curve portions arranged in a parallel shift positional relation with each curve portion not intersecting with another. The length of the diffraction grating 1 in a direction perpendicular to that shift direction of the curve portions is made substantially equal to the length of the opening of the light-shutting element of the light-shutting means 3. The diffraction grating element is repeated at least once in a direction perpendicular to the shift direction the curve portions to provide the cell as set out above. Further, the length of the cell in the direction perpendicular to the shift direction of the curve portions is substantially equal to the length of the pitch of the light-shutting element of the light-shutting means 3.

As the diffraction grating pattern of the present embodiment, use is made of a pattern whose curve pattern is repeated, at the width of the light-shutting element, up to the pitch length of the light-shutting element in a parallax-creating direction (normally in a horizontal direction) as shown in FIG. 3.

Here, the cell of which the diffraction grating 1 is comprised is made substantially equal in size to the size of the pitch of the light-shutting element.

As the light-shutting means 3 use is made of, for example, a space light modulation element (for example, a liquid crystal panel) and, by doing so, a display pattern on the space light modulation element can be varied for a short period of time with the use of a liquid-crystal drive device, not shown, so that it is possible to obtain an animation as a three-dimensional image.

With the diffraction grating-equipped display of the present embodiment so arranged, a light-shutting means 3 having an opening of a predetermined configuration is disposed on the illumination light entry side of the diffraction grating 1 and the diffraction grating 1 is comprised of a plurality of curve portions arranged in a parallel shift relation with any given curve portion not intersecting with adjacent curve portions. Further, the length of the diffraction grating 1 in a direction perpendicular to the shift direction of the curve portions is made substantially equal to the length of the opening of the light-shutting element of the light-shutting means 3 and the diffraction grating element is repeated at least once in a direction perpendicular to the shift direction of the curve portions to provide the cell as set out above. The length of the cell in the direction perpendicular to the shift direction of the curve portions is made substantially equal to the pitch length of the light-shutting element of the light-shutting means 3.

That is, use is made of a pattern whose curve pattern is repeated, at the width of the light-shutting element, up to the pitch length of the light-shutting element in a parallax-producing direction (normally in a horizontal direction) as shown in FIG. 3.

As a result, even if there occurs a positional displacement between the diffraction grating 1 and the light-shutting element in a pitch range of the light-shutting element, those defects resulting from the positional displacement are complemented by the adjacent curve portions, as shown in FIG. 1, due to the repeated curve pattern so that a correct reproduction image can be obtained due to a resultant diffraction light being so complemented.

In other words, it is possible to readily achieve positional alignment between the light-shutting means 3 and the diffraction grating pattern and hence to form the display as a low-cost and large-sized unit.

Viewed in front of the display, the observer can observe a display image through his or her right/left eye's parallax and hence a solid image (three-dimensional image) on the display.

Further, if the observer shifts his or her visual point in the horizontal direction, an image now on the display is smoothly varied, thus obtaining a "view-around-a-solid-object" effect. It is, therefore, possible for the observer to obtain a natural "solid" feeling.

Further, since the diffraction grating is comprised of parallel curve portions, it is also possible to provide "horizontally broadening" diffraction light. For this reason, an image obtained has no skip or discontinuity and, the observer, shifting his or her visual point in a horizontal direction, can observe a color-stable solid image as a better reproduction image.

In the conventional device, a diffraction grating is comprised of parallel straight lines and, for light of a given wavelength, a light is obtained, thus failing to produce a horizontally broadened light. Viewing the display in a distant position while moving in a horizontal direction, a display image can be viewed in some position but cannot in another position (the skipping or discontinuity of an image). If a display image cannot be seen from either a right or a left eye of the observer, then it is not possible to obtain a stereoscopic vision. Any skipping or discontinuity of the image imparts a discomfort to the viewer. According to the present invention, on the other hand, such a discomfort problem can be solved.

Even if the diffraction grating 1 is one kind only, the light-shutting means 3 only can be replaced with another with a different configuration so that a type of image pattern can be varied freely.

That is, it has been naturally required that, with an electronic light drawing device, etc., a different diffraction grating demand a different type of image pattern. According to the present embodiment, on the other hand, the same diffraction grating can be used irrespective of the type of image pattern used, unlike the conventional case just as set out above. Simply by replacing the light-shutting means 3 only, it is possible to freely represent a solid (3-D) image.

To be specific, with the electronic light drawing device, etc., the manufacture of a diffraction grating has taken a lot of time and labor. According to the present embodiment, on the other hand, it can be much efficiently achieved at low costs for a brief period of time.

It may be added that the display of the present embodiment is brighter than the "solid" display of a hologram, etc., and can provide an image of less noise.

With the display having a diffraction grating pattern of the present embodiment, the diffraction grating is made greater in size, but substantially equal in pitch to, the light-shutting element and, even if positional accuracy is poor between the diffraction grating pattern and the light-shutting means 3, a correct image can be provided a a reproduction image.

By doing so, no high accuracy is required in positional alignment between the light-shutting means 3 and the diffraction grating pattern. It is, therefore, possible to simply and readily make positional alignment and hence to manufacture the display of the present embodiment as a large low-cost unit.

A second embodiment of the present embodiment will be explained below.

Figure 2:
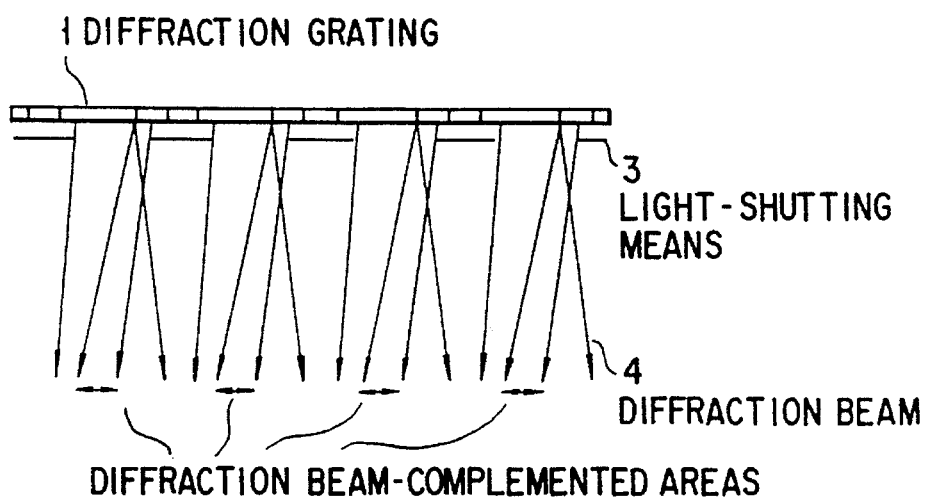
FIG. 2 is a diagrammatic view showing a diffraction grating pattern-equipped display according to a second embodiment of the present embodiment.

FIG. 2 is a diagrammatic view showing a practical form of a diffraction grating pattern-equipped display according to a second embodiment of the present invention with the same reference numerals employed to designate parts or elements corresponding to those shown in FIG. 1.

The diffraction grating pattern-equipped display of the present embodiment provides a display body having a diffraction grating pattern with each minute diffraction grating 1 arranged over the surface of a substrate for each cell.

Relative to the display body, a light-shutting means 3 is arranged on a diffraction light exit side of the diffraction grating 1 and has an opening of a given configuration (a square configuration in the present embodiment).

The diffraction grating 1 is comprised of curve portions formed in a parallel shift positional relation with any given curve portion not intersecting with adjacent curve portions. The length of the diffraction grating 1 in a direction perpendicular to the shift positional direction of the curve portions is made substantially equal to that of an opening of the light-shutting element of the light-shutting means 3. The diffraction grating element is repeated at least once in a direction perpendicular to the shift direction of the curved portions to provide a cell as set out above. The length of the cell in a direction perpendicular to the shift direction of the curve portions is made substantially equal to the pitch length of the light-shutting element of the light-shutting means 3.

That is, as the diffraction grating pattern of the present embodiment, use is made of a pattern having a curve pattern repeated at the width of the light-shutting element up to a pitch length of the light-shutting element in a parallax-produced direction (normally in a horizontal direction) as shown in FIG. 3.

Here, the cell composed of the diffraction grating element is made substantially equal in size to the pitch of the light-shutting element.

The light-shutting means 3, comprised of a space light modulation element (ex. a liquid crystal display panel) for example, is used so that a display pattern on the space light modulation element can be varied, for a brief period of time, with the use of an LC-drive device not shown. By doing so it is possible to obtain an animation as a 3-D image.

With the diffraction grating pattern-equipped display of the present invention thus arranged, the light-shutting means 3 with an opening of a given size is arranged on the illumination light entry side of the diffraction grating and the diffraction grating element is comprised of a plurality of curve portions formed in a parallel shift direction with any given curve portion not intersecting with adjacent curve portions. Further, the length of the diffraction pattern in a direction perpendicular to the shift direction of the curve portions is made substantially equal to that of the opening of the light-shutting element of the light-shutting means. The diffraction grating element is repeated at least once in a direction perpendicular to the shift direction of the curve portions to provide the cell as set out above. The length of the cell in a direction perpendicular to the shift direction of the curve portions is made substantially equal to the pitch length of the light-shutting element of the light-shutting means 3.

That is, use is made of a pattern whose curve pattern is repeated, at the width of the light-shutting element, up to the pitch length of the light-shutting element in a parallax-produced direction (normally in a horizontal direction) as shown in FIG. 3.

Even if any positional displacement is produced between the diffraction grating 1 and the light-shutting element in a pitch range of the light grating element, those defects resulting from the positional displacement are complemented by those adjacent curve portions, as shown in FIG. 1, due to the curve pattern repeated as set out above and hence resulting diffraction light 4 is complemented to provide a correct image and obtain as a reproduced image.

The present invention is not restricted to the above-mentioned embodiments and can be reduced to practice in a similar way.

(a) Although, in the respective embodiment, the light-shutting means 3 has been explained as using the space light modulation element, it cannot be restricted thereto. As the light-shutting means 3, use can be made of a means using, for example, printed ink in which case it is placed over the diffraction grating so as to obtain a light-shutting effect. This method more simplifies its manufacturing process and it is still possible to obtain a 3-D image. In this case, the length of an opening of the light-shutting element may be made substantially equal to one pitch length as set out above.

Further, through the superimposition of image patterns by printing, it is possible to obtain an effect of the superimposition of a solid image and a planar image by printing.

(b) Although, in the respective embodiments, explanation has been made in connection with obtaining a 3-D image (a solid image), the present invention is not restricted thereto and can equally be applied to the art of varying an image through the use of parallax.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A diffraction grating array comprising:

a substrate;

a light-shutting means having at least one light-shutting element; and a plurality of diffraction grating cells formed over a surface of the substrate, wherein each of said plurality of diffraction grating cells respectively comprises a diffraction grating element having curve portions arranged in a parallel shift relation, wherein a length of the diffraction grating element in a direction perpendicular to said shift direction of the curve portions is substantially equal to a length of an opening of said at least one light-shutting element of said light-shutting means;

said diffraction grating element is repeated in a direction perpendicular to the shift direction of the curve portions to form said cell; and a length of the cell in the direction perpendicular to the shift direction of the curve portions is substantially equal to a pitch length of said at least one light-shutting element in the light-shutting means; and wherein the diffraction grating element is larger in size, but equal in pitch, to said at least one light-shutting element.

2. A display having a diffraction grating, comprising:

a substrate;

a plurality of diffraction grating cells formed over a surface of the substrate, wherein each of said plurality of diffraction grating cells respectively comprises a diffraction grating element having curve portions arranged in a parallel shift relation; and light shutting means including at least one light-shutting element having an opening; wherein a length of the diffraction grating element in a direction perpendicular to said shift direction of the curve portions is substantially equal to a length of the opening of said light-shutting elements in said light-shutting means;

said diffraction grating element is repeated in a direction perpendicular to the shift direction of the curve portions to form said cell;

a length of the cell in the direction perpendicular to the shift direction of the curve portions is substantially equal to a pitch length of said at least one light-shutting element in the light-shutting means; and the light-shutting means is arranged on an illumination light entry side of the diffraction grating and has an opening of a given configuration;

wherein the diffraction grating element is larger in size, but equal in pitch, to said at least one light-shutting element.

3. A display having a diffraction grating pattern, comprising:

a substrate;

a plurality of diffraction grating cells formed over a surface of the substrate, wherein each of said plurality of diffraction grating cells respectively comprises a diffraction grating element having curve portions arranged in a parallel shift relation; and light shutting means including at least one light-shutting element having an opening; wherein a length of the diffraction grating element in a direction perpendicular to said shift direction of the curve portions is substantially equal to a length of the opening of said light-shutting elements in said light-shutting means;

said diffraction grating element is repeated in a direction perpendicular to the shift direction of the curve portions to form said cell;

a length of the cell in the direction perpendicular to the shift direction of the curve portions is substantially equal to a pitch length of said at least one light-shutting element in the light-shutting means; and the light-shutting means is arranged on a diffraction light exit side of the diffraction grating and has an opening of a given configuration;

wherein the diffraction grating element is larger in size, but equal in pitch, to said at least one light-shutting element.

4. The display according to claim 2, wherein said light-shutting means uses a space light modulation element.

5. The display according to claim 3, wherein said light-shutting means uses a space light modulation element.

6. The display according to claim 2, wherein said light-shutting means uses printed ink.

7. The display according to claim 3, wherein said light-shutting means uses printed ink.

8. The display according to claim 4, wherein said space light modulation element is comprised of a liquid crystal.

9. The display according to claim 5, wherein said space light modulation element is comprised of a liquid crystal.

* * * * *

UNITED STATES PATENT AND TRADEMARK OFFICE
CERTIFICATE OF CORRECTION

PATENT NO.:     5,617,248
DATED      :     April 1, 1997
INVENTOR(S):    TAKAHASHI et al.

It is certified that error appears in the above-identified patent and that said Letters Patent is hereby corrected as shown below:

On the title page, item [54], and column 1:

Please add therefor the word --PATTERN-- to be the last word in the Title.

Signed and Sealed this

Twelfth Day of August, 1997

Attest:

BRUCE LEHMAN

Attesting Officer      Commissioner of Patents and Trademarks